Oct. 25, 1960

D. E. NICHOLS 2,957,658

ANTI-SKID BRAKE CONTROL SYSTEM WITH LOCKED
WHEEL PREVENTION MEANS

Filed Jan. 28, 1957

INVENTOR.
DONALD E. NICHOLS

BY
Reynolds, Beach & Christensen

ATTORNEYS

United States Patent Office 2,957,658
Patented Oct. 25, 1960

2,957,658

ANTI-SKID BRAKE CONTROL SYSTEM WITH LOCKED WHEEL PREVENTION MEANS

Donald E. Nichols, Seattle, Wash., assignor to Boeing Airplane Company, Seattle, Wash., a corporation of Delaware Filed Jan. 28, 1957, Ser. No. 636,685

5 Claims. (Cl. 244—111)

This invention relates to improvements in automatic brake control systems and more particularly concerns an improved anti-skid brake control system with means for releasing the brakes automatically in response to a locked wheel condition. The invention is herein illustratively described by reference to the presently preferred form thereof as applied to the landing gear of "707" and "KC–135" type airplanes; however, it will be recognized that certain modifications and changes therein with respect to details may be made and that the invention may be applied to different types of airplanes without departing from the essential features involved.

Skid-preventing apparatus employing flywheel-actuated switches or the like sensitive to reduction of wheel speed below normal ground speed depend for their operation upon wheel rotation. Therefore, it is desirable during approach of the airplane to the runway during landings to condition the skid-preventing apparatus so that the brakes cannot be applied by the pilot until after the airplane wheels have first touched the ground and commenced rotation. If, however, certain of the braked wheels bounce or strike a slippery patch of runway during the landing run it is possible for such wheels to be stopped or locked by the brakes and thereby render the associated skid preventing apparatus inoperative. Consequently, it is also desirable in such systems to condition the skid-preventing apparatus so as to interrupt brake application in response to a locked wheel condition developing during the landing run. On the other hand it is essential that the arming means which prevents a locked wheel condition accomplish its function only during the landing run proper and that it be rendered inoperative automatically when the airplane has slowed down to taxiing speed so that the brakes will not be released when the airplane is taxiing slowly or when it is at a standstill.

The present invention provides a new and effective means in such skid-preventing systems for achieving the above-described results. More particularly a general object hereof is to provide a simple, reliable and compact means by which to accomplish the foregoing results and which will be adapted for use in known and practical brake control systems, such as the "Ministop" anti-skid system of the Gruen Watch Company, for example, or others.

In its illustrated embodiment the invention is applied to one of the two landing gear units or trucks of a "707" type airplane, for example, each of which units has two pairs of wheels mounted in alignment on respectively opposite sides of the landing strut. Each pair of wheels is under control of a separate solenoid valve responsive to skidding of either wheel in the pair so as to interrupt brake application sufficiently to permit recovery of running speed. In addition, each wheel of a pair has a speed-operated switch connected to operate the associated solenoid valve for releasing the brakes in response to wheel speed reduction below a predetermined speed. Switch means interposed in such connections for all of the speed-controlled switches are normally closed to permit such operation. However, the interposed switches are arranged to be opened by a relay actuated in response to simultaneous actuation of all of the speed-controlled switches, thereby to interrupt such connections when all of the wheels have stopped or dropped in speed below said predetermined value, indicating that the airplane itself has been decelerated to taxiing speed or to a standstill, so that the speed sensitive switches cannot then operate the solenoid valves to release the brakes.

These and related features, objects and advantages of the invention will become more fully evident from the following description thereof by reference to the accompanying drawings.

Figure 1:
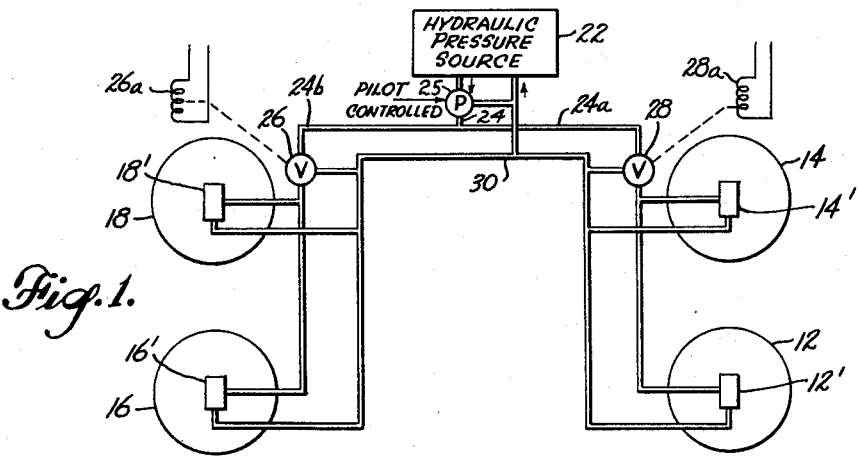
Figure 1 is a simplified schematic view of a hydraulic brake system for one landing gear truck, including two pairs of wheels as aforementioned.

Referring to the drawings, the landing gear unit or truck, of which there are two in the illustrated case, comprises a strut having an oleo assembly 10 with telescoping parts. The carriage proper upon which the two pairs of landing wheels 12, 14 and 16, 18 are mounted, on respectively opposite sides of a longitudinal midplane containing the strut, is of suitable construction the details of which are not important herein. A squat switch 20 closed in flight is automatically opened when the oleo is deflected under load by contact of the wheels with the runway. The wheels 12, 14, 16 and 18 have separate hydraulic brake actuators 12', 14', 16' and 18' respectively. A hydraulic pressure source 22 has an output conduit 24 in which is located a pilot-controlled pressure metering valve 25 and which, beyond this valve, branches into two conduits 24a and 24b. A solenoid-actuated valve 26, actuated by a solenoid 26a is interposed in conduit 24b and a similar valve 28 actuated by solenoid 28a is interposed in conduit 24a. Beyond these solenoid-actuated valves the conduits 24a and 24b have branches leading to the individual brake actuators as shown. Each of the brake actuators and each of the three valves thus far described have the usual return conduit connections which are connected to the hydraulic pressure source return conduit 30. The arrangement is such, therefore, that the pilot by operating the metering valve 25 may apply pressure to the brake actuators simultaneously for decelerating the airplane with any desired degree of braking effort. In the case of an airplane having two similar landing gear units or trucks, the same valve or separate valves similar to the valve 25 may be employed. The present invention is concerned with the automatic skid-preventing means operatively associated with the solenoid valves 26 and 28, and more particularly with the actuating solenoids thereof, 26a and 28a, by which the aforementioned results are achieved.

Figure 2:
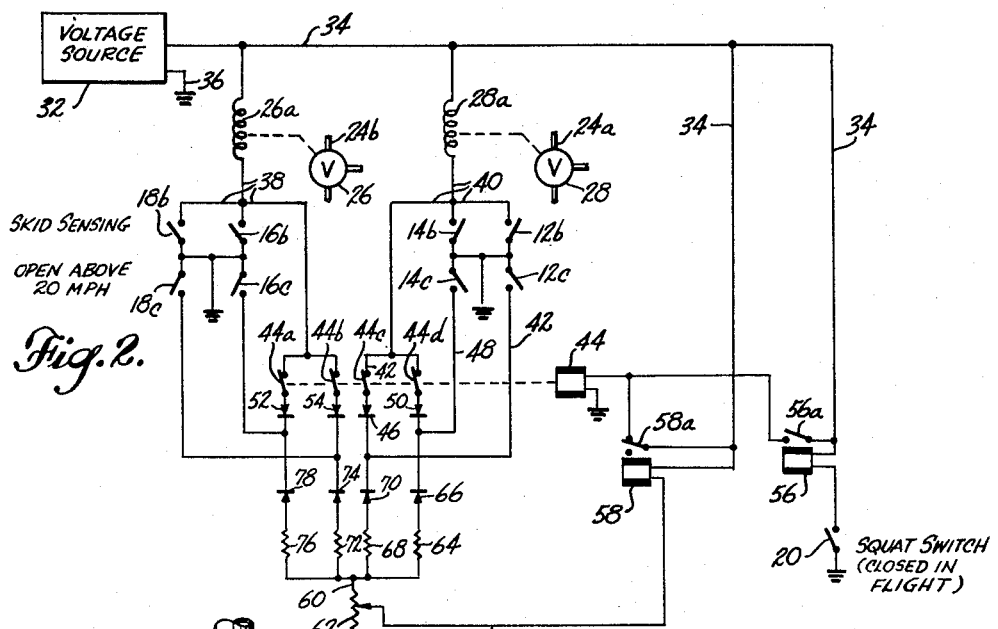
Figure 2 is a schematic circuit diagram of the illustrated embodiment of the invention applicable to such a hydraulic brake system.
Figure 3:
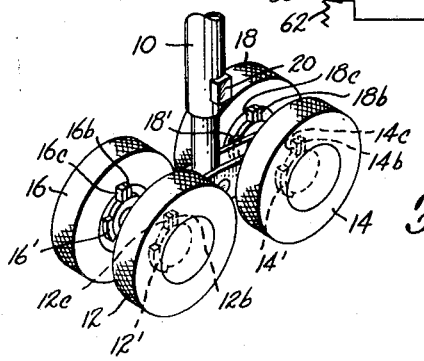
Figure 3 is a simplified perspective view of the landing gear truck to which reference is herein made.

Referring to Figure 2 wherein the solenoid valves and actuating solenoids are illustrated schematically in conjunction with the associated automatic control circuit apparatus, each of the four wheels 12, 14, 16 and 18 control the operation of individual skid-sensing switches 12b, 14b, 16b and 18b and individual speed sensitive switches 12c, 14c, 16c and 18c, respectively, which are mounted in association with such wheels on the landing gear truck as shown in simplified form in Figure 3. The skid-sensing switches may incorporate a suitable or known actuating mechanism, such as a flywheel mechanism, by which the individual switches are closed during skid-induced deceleration of the particular wheel or wheels below normal running speed. Typical switches of this type are of the flywheel-actuated type wherein the flywheel is caused by wheel rotation to rotate at wheel speed but is provided with an overrunning clutch permitting it to exceed wheel speed in the event the wheel suddenly decelerates by skidding, thereby to close the skid-sensing switch contacts. The details of such mechanisms are not shown herein because they are already well known in the art. Likewise the speed-controlled switches 12c, 14c, 16c and 18c are or may be of any suitable or known type such as governor operated switches using flyball mechanisms or the like capable of closing such switches automatically in response to reduction of wheel speed to a predetermined value, such as 20 miles an hour, representing maximum taxiing speed, for example. The details of wheel speed-controlled switch mechanisms suitable for this purpose are also omitted from the present disclosure because they form no part of the present invention as such. The drawings, therefore, illustrate primarily the switch contacts themselves which will be understood to be operated by and in accordance with the types of mechanisms and operating conditions described.

A voltage source 32, such as a standard 28 volt D.C. source, has an output conductor 34 connected to one side of each of the actuating solenoids 26a and 28a, and a ground or common conductor 36. The opposite side of solenoid 26a is connected through conductor 38 to one side of each of the switches 16b and 18b, whereas the opposite side of solenoid 28a is connected through conductor 40 to one side of each of the switches 12b and 14b. The opposite sides of these four switches are grounded as shown.

One side of the speed-controlled switch 12c is connected to conductor 40 through a conductor 42 in which is interposed, serially, a relay switch 44c of relay 44, and a rectifier 46 polarized to permit flow of current through solenoid 28a when the switches 12c and 44c are closed. Similarly speed-controlled switch 14c is connected through a conductor 48 to the conductor 40 through the relay switch 44d and rectifier 50 polarized similarly to rectifier 46. In like manner speed-controlled switch 16c is connected to conductor 38 through rectifier 52 and relay switch 44a while switch 18c is connected to conductor 38 through rectifier 54 and relay switch 44b.

Relay 44 is normally energized, maintaining the four switches thereof, 44a, 44b, 44c and 44d, closed. Consequently, when either wheel of either pair of wheels drops below a predetermined speed the resulting closure of the associated speed-controlled switch will cause energization of the valve-actuating solenoid associated with that pair, and release the brakes of the associated wheels.

Relay 44 may be connected to conductor 34. This latter relay is connected to conductor 34 for energization through the contacts 56a of squat switch relay 56 energized by closure of squat switch 20 with the airplane in flight. Thus, relay 44 is energized with the airplane in flight, maintaining its switch contacts 44a, 44b, 44c and 44d closed. Since the speed-controlled switches 12c, 14c, 16c and 18c are then closed, the valve-actuating solenoids 28a and 26a are energized and the brakes are consequently released despite any attempt by the pilot to apply the brakes by operation of the metering valve 25.

The second possible path of energization of relay 44 is through the switch contacts 58a of relay 58. This relay is connected on one side to conductor 34 and on its opposite side to conductor 60. A variable resistance 62 is interposed in the latter. A series resistance 64 and rectifier 66 are connected between conductor 60 and the junction between speed-controlled switch 14c and rectifier 50, with the polarity of rectifier 66 being such as to permit current flow through relay 58 when speed-controlled switch 14c is closed. A similar resistance 68 and rectifier 70 are connected between conductor 60 and the junction between rectifiers 48 and switch 12c. A similar resistance 72 and rectifier 74 are likewise connected between conductor 60 and the junction between rectifier 54 and switch 18c, while a similar resistance 76 and rectifier 78 are connected between conductor 60 and the junction between rectifier 52 and switch 16c. Thus, the magnitude of current permitted to flow through relay 58 is determined by the number of speed-controlled switches which are closed at any given time. The current required to energize relay 58 sufficiently to actuate the contacts 58a into the open position so as to deenergize relay 44 is caused to flow only by closure of all four of the speed-controlled switches 12c, 14c, 16c and 18c. Variable resistance 62 is a trimming resistance which is initially adjusted to insure that result and to preclude closure of a lesser number of speed-controlled switches from actuating relay 58. Thus, if with the airplane on the ground all four of the speed-controlled switches are closed, locked wheel arming or disconnect relay 44 becomes deenergized, opening contacts 44a, 44b, 44c and 44d and preventing the speed-controlled switches from causing energization of the valve-actuating solenoids 26a and 28a to release the brakes. Consequently, during taxiing and parking of the airplane full braking potentiality is assured. However, if during the landing run three or less of the landing wheels in the truck should leave the ground or enter a prolonged skid, causing a locked wheel condition, the solenoid valves 26 and/or 28 will be actuated to release the brakes even though the skid-sensing switches of the associated wheels have become inoperative, such brake release being effected by closure of the associated speed-controlled switches forming energizing circuits for the actuating solenoids through the still-closed contacts of relay 44.

While in certain applications a separate solenoid valve for each of the airplane wheels may be necessary or desirable, one such valve for each pair of wheels is all that is required in the illustrated case. The two wheels of each pair run in the same track or path and are relatively close to each other. Consequently, the conditions which produce or are likely to produce skidding or a locked wheel are substantially the same for each wheel of the pair. If either such wheel skids or becomes locked, release of the brakes of both wheels is in order. However, use of individual skid-sensing and wheel-speed-controlled switches for each wheel of a pair to control the solenoid valve associated with the pair is desirable to insure reliable detection of a skid or locked wheel condition.

Rectifiers 50, 46, 54 and 52 are incorporated in the circuit to prevent possible energization of speed sensing relay 58 by flow of current through the skid sensing switches 12b, 14b, 16b and 18b. Rectifiers 66, 70, 74 and 78 are incorporated in the circuit to prevent possible undesired energization of one of the valve-actuating solenoids 26a and 28a by closure of one of the speed-controlled switches 12c, 14c, 16c or 18c associated with a different pair of wheels than that with which the particular solenoid is associated. In other words, rectifier 70, for example, prevents the possible flow of energizing current through solenoid 28a by following a path including, in series relationship, said solenoid, rectifier 46, resistance 68, resistance 76 and speed-controlled switch 16c. The other rectifiers 66, 74 and 78 perform similar functions with respect to other possible undesired energizing current paths formed through the speed-controlled switches.

From the foregoing it will be observed that operation of the improved system is as described hereinabove. During the airplane's approach to the landing field, squat switch 20 is closed by (oleo deflection), as are the speed-controlled switches 12c, 14c, 16c and 18c since the wheels are then not rotating. Since relay 44 is then actuated by the squat switch relay 56 in order to maintain the contacts 44a, 44b, 44c and 44d closed, the brake release valve solenoids 26a and 28a are energized through the speed-controlled switches. Thus the brakes will be released at the instant the wheels touch the ground regardless of the setting of valve 25, so as to minimize any loss of rubber on ground contact and so as to permit the wheels to come up to full running speed as fast as possible to condition the skid-sensing switch mechanisms for operation. Braking of the wheels by the pilot operating the valve 25 is permitted as soon as the wheels accelerate to a speed above that at which the speed-controlled switches 12c, 14c, 16c and 18c are designed to close, which may be 20 miles per hour, for example. When that speed is reached, the energizing circuits for the respective brake-release valve solenoids 26a and 28a are opened. When the landing gear bears a substantial portion of the airplane's weight the squat switch 20 opens. However, the opening of speed-controlled switches 12c, 14c, 16c and 18c effects deenergization of relay 58, causing closure of switch contacts 58a and continued energization of relay 44 so as to maintain the contacts of the latter relay in closed position.

As long as none of the wheels becomes locked the system operates to prevent wheel skidding by intermittent closure of one or more of the skid sensing switches 12b, 14b, 16b or 18b in response to slipping of any wheel on the runway due to excessive braking. However, should any of the four landing wheels of the illustrated landing gear truck drop below the actuating speed of the associated speed-controlled switch 12c, 14c, 16c or 18c, as during bounce of the associated wheel or wheels, or rolling thereof on an excessively slippery patch of runway, closure of the speed-controlled switch or switches will produce energization of the corresponding solenoid 26a or 28a, inasmuch as the relay 44 is then energized and its contacts are closed. The system therefore operates to prevent a locked wheel condition which would otherwise go undetected because of the nature of the skid-sensing switch units employed.

As the airplane is decelerated to the speed at which switches 12c, 14c, 16c and 18c are designed to close, the currents flowing through resistances 64, 68, 72 and 76 become sufficient in total to energize relay 58, open its contacts 58a and thereby deenergize relay 44. The contacts of the latter open and thereby prevent any further energization of valve-actuating solenoids 26a or 28a. Consequently, full braking is available to the pilot without danger of interruption by closure of the speed-controlled switches during taxiing or parking of the airplane.

I claim as my invention:

1. In an airplane anti-skid brake control system including in combination with a plurality of landing wheels, brakes for said wheels, controlled means for applying said brakes, separate brake-interrupting means associated with the brakes of each of said wheels and operable to interrupt application of such brakes independently of those of any other of said wheels by said controlled means, separate skid-sensing means connected to the respective brake-interrupting means and separately operable by a skid-produced reduction of speed of the associated wheels below wheel ground speed to operate the brake-interrupting means respectively connected thereto; separate wheel-speed-controlled means connected to the respective brake-interrupting means and separately operable by reduction of speed of the associated wheels to a predetermined relatively low speed to operate the brake-interrupting means respectively connected thereto, thereby to prevent a locked wheel condition, disconnect means interposed in the connections between said wheel-speed-controlled means and said brake-interrupting means and operable to interrupt said connections simultaneously, and singular actuating means operatively connected to all of said disconnect means and in turn connected to said wheel-speed-controlled means to be controlled thereby, said actuating means including means responsive to reduction of speed of all of said wheels, and not less than all of said wheels, below said predetermined low speed for operating said disconnect means, thereby to prevent interruption of brake application during taxiing and parking of the airplane.

2. The brake control system defined in claim 1, and squat switch means operatively connected to the disconnect means and controlled by removal of airplane weight for the landing wheels to operate said disconnect means, thereby to interrupt brake application with the airplane in flight.

3. The brake control system defined in claim 2, wherein the brake-interrupting means comprise electrically actuated means, the wheel-speed-controlled means include switch means connected to energize said electrically actuated means, the disconnect means comprise electrical switches, and the actuating means comprise relay circuit means controlling said latter switches, said relay circuit means including a relay coil and a plurality of energizing circuit connections between said relay coil and the respective wheel-speed-controlled switch means, each of said energizing circuit connections providing a path of predetermined electrical resistance for energizing current to flow through said relay coil, relay actuation being effected by the total of energizing currents permitted to flow through all of said energizing circuit connections.

4. The brake control system defined in claim 1, wherein the brake-interrupting means comprise electrically actuated means, the wheel-speed-controlled means include switch means connected to energize said electrically actuated means, the disconnect means comprise electrical switches, and the actuating means comprise relay circuit means controlling said latter switches, said relay circuit means including a relay coil and a plurality of energizing circuit connections between said relay coil and the respective wheel-speed-controlled switch means, each of said energizing circuit connections providing a path of predetermined electrical resistance for energizing current to flow through said relay coil, relay actuation being effected by the total of energizing currents permitted to flow through all of said energizing circuit connections.

5. In an airplane anti-skid brake control system, in combination with a plurality of landing wheels, brakes for said wheels, controlled means for applying said brakes, separate brake-interrupting means controlled by rotation of the respective wheels and operable in response to a skid-produced reduction of wheel speed below wheel ground speed to interrupt application of the brakes thereof independently of those of any other of said wheels by said controlled means; separate wheel-speed-controlled brake-interrupting means operatively connected to the respective brake-applying means and adapted to be controlled by speed of the respective wheels to interrupt application of the brakes of every wheel whose speed drops below a predetermined value, and locked wheel arming means connected to said wheel-speed-controlled brake-interrupting means and in turn including means arranged to be controlled by speed of wheel rotation, said arming means including singular means responsive to reduction of speed of all of said wheels to a predetermined value, thereby to prevent operation of any of said wheel-speed-controlled brake-interrupting means, while being insensitive to speed reduction of less than all of said wheels.

References Cited in the file of this patent
UNITED STATES PATENTS

| | | |
|---|---|---|
| 2,663,521 | Yarber | Dec. 22, 1953 |
| 2,744,699 | Lucien | May 8, 1956 |
| 2,788,186 | Wilson | Apr. 9, 1957 |